Aug. 16, 1966  J. R. M. GIRARD  3,267,328
LIGHT FLASH GENERATOR DEVICE WITH PLURAL STORAGE CONDENSER
Filed June 12, 1962  2 Sheets-Sheet 1

Inventor:
Jean R. M. Girard
By Kenyon, Palmer, Stewart
& Estabrook
Attorneys

United States Patent Office 3,267,328
Patented August 16, 1966

3,267,328
LIGHT FLASH GENERATOR DEVICE WITH PLURAL STORAGE CONDENSERS
Jean René Marie Girard, 4 Rue de Montmorency, Boulogne-Billancourt, France
Filed June 12, 1962, Ser. No. 201,988
Claims priority, application France, June 19, 1961, 865,543, Patent 1,300,240
8 Claims. (Cl. 315—163)

The present invention concerns improvements in or relating to devices for the generation of light flash by the sudden temporary discharge of one or several electric condensers into electronic discharge tubes. Such devices are now currently used for industrial processes and it is one object of the invention to provide a device of this kind wherein the powers of the light flashes may be determined and varied from a simple control by the user thereof.

The operation of a light flash generator in accordance with the present invention is mainly based on the charge and discharge of at least one electric condenser. The energy in the flash equals ½ $C.V^2$, C being the capacity of the condenser and V, the charging voltage of said condenser. For varying the energy, one may vary either the capacity or the voltage. The method consisting of varying the voltage does not appear satisfactory as this voltage can only vary within relatively narrow limits for a suitable activation of the discharge and as, in equipments utilising such devices for the purpose of taking pictures in the light of the flashes, the temperature of colors varies with the voltage value. For industrial purposes, however, one must dispose of quite a broad range of adjustment of the energy, generally in a graded sequence of discrete values as for instance, a sequence of discrete values wherein each value is twice the preceding one from the lower end to the upper end of a scale.

The method consisting of varying the capacity provides a much broader range of energy values. Theoretically an arrangement comprising several condensers of diversified values which may be selected from a group selecting switch may provide the desired result. However, such an arrangement presents serious drawbacks in actual practice as for instance it cannot make use of a charged condenser and a discharged one when the switch puts such condensers in parallel with the load.

It is a further object of the invention to provide a multiple condenser selection switch arrangement for avoiding such drawbacks, while being capable of delivering high energies selected over a wide range of values. This in contradistinction with the arrangement disclosed in U.S. Patent No. 2,867,209 dated January 6, 1959 in the names of Messrs. A. G. Foures, J.R.M. Girard and R. L. de Montard, wherein the disclosed arrangement, quite suitable for small energies and restricted range of variation of energies, includes a permanently connected condenser without any protection resistance with respect to the load, which is obviously damaging for high energies and broad energy range.

The invention is mainly based on the fact that the main cause of damage to condensers in a multiple selector switch arrangement for controlling flashes in light flash generators utilising electronic discharge tubes lies in overheating resulting from the alternating component in the circuits, and more definitely from: (1) the excessively high current value of the pulsated current for recharging the condensers after an appreciably long period of rest; (2) the higher value of the current of balance resulting from the putting in parallel, without special precautions a charged condenser and a discharged condenser, said current value not being limited in practice as a condenser is an electricity accumulator without internal resistance.

According to a feature of the invention, a flash generator device comprising a plurality of condensers which are put in parallel for their common charge and may be variously combined on a load for their selective discharge by means of a switch, is mainly characterised in that each one of said condensers is in series with a resistance in its charging circuit and presents a discharge circuit, separate from its charge circuit, wherein means are provided for selecting in an on-off basis those condensers which are due to enter in the discharge, said selection being made by bringing to zero the values of resistances in each branch wherein the condenser must be connected to the high voltage discharge lead.

According to a further feature of the invention, in one embodiment thereof, said resistances each consist of a logarithmic resistance decreasing from the input charging voltage lead to its connection point to the condenser, the slider of such a potentiometer resistance being connected to the discharge lead for contributing to the energy of the light flashes according to the position to which said slider has been adjusted.

According to another feature of the invention, in another embodiment thereof, each one of the said resistances consists of a series connection of resistors of decreasing value from the lead-in wire to the condenser plate, and a plural position switch, one position of which is inactive is connected to permit the selective connection of taps between said resistors and the discharge lead in the device.

With either of said embodiments, there is no danger of damaging the adjustment contacts when, after a flash is controlled, the operator actuates a slider or switch of said adjustment contacts prior to the re-aligning of the voltages across the condensers. With an arrangement according to the present invention, the current circulating throughout the condenser and resistor arrangements will always be limited as the controlled resistance is decreased by the actuation of the operator, so that the voltage balance across all condensers will always be obtained prior to the moving of the sliders or closing of the contacts of the switch at the plate of the condensers.

When the device is used for repeated flashes at very short intervals, the rectifier supplying the condensers must be of high compacity so that the condensers may be very rapidly charged. However, the controlled electronic discharge tube or tubes must be de-ionized. In order to protect against the possibility such tube or tubes may remain ionized even after a flash from the rectifier proper, it is further provided, according to another feature of the invention, not imperatively used for devices not made for closedly repeated flashes, to design the combination switch or the contacts controlling the discharge so that its actuation or their actuations also ensures a temporary cut-off of the supply.

These and further features will be described in detail with reference to the accompanying drawings, wherein.

Figure 1:
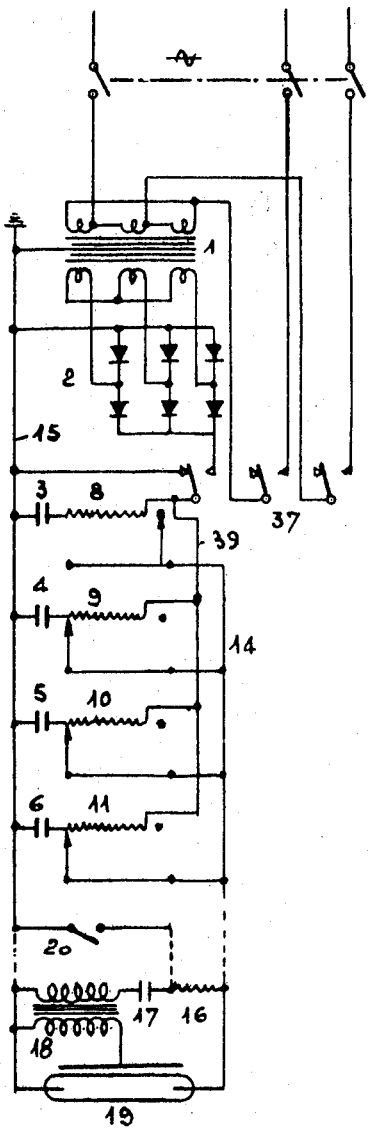
FIG. 1 shows a first embodiment of a light flash generator device according to the invention and using logarithmic potentiometers for resistors.

Referring to FIG. 1, the supply transformer is shown at 1; for the sake of illustration, this is shown as a three-phase supply, the transformer having a delta-connected primary winding and a star-connected secondary winding. Said transformer feeds a full-wave rectifier 2 the output voltage of which will be applied to the lead 39 of the charging circuit for the condensers 3 to 6 (four condensers for the sake of illustration also). The lead 39 will be energized when the contact 37 is in the position for charging the condensers by the output voltage from the rectifier. Each condenser as shown may comprise several series-connected condensers if required. Condensers 3 to 6 are connected to lead 39 through resistors 8 to 11 respectively. The other plates of the condensers are connected to a ground wire 15. A screen in the transformer 1 may also be grounded to the line 15.

Resistors 8 to 11 are each logarithmic potentiometers, i.e., the value of resistance of each of them tapers according to a logarithmic law from its point of connection to the lead 39 to its connection to the condenser plate. The slider of each potentiometer may be moved from the point of connection to the condenser plate up to a dead terminal on the other side of the resistor. Each potentiometer slider is connected to the discharge lead 14. From the above, it is now quite obvious that the charge and discharge circuits of the condensers are completely separate.

Between leads 14 and 15 a circuit is connected for the activation of the flash electronic discharge tube 19. Said circuit conventionally comprises a resistance in series with a condenser and the primary winding of a magnetic core induction coil (said core preferably being a material such as a ferrite). Resistance 16, small condenser 17 and the primary winding of said induction coil 18 are serially connected but an impulse contact 20 shunts the condenser-primary winding part of said series connection. The secondary winding of the induction coil 18 is connected between ground and the starting electrode of the tube 19, while the normal electrodes are connected to the leads 14 and 15. The manual closing, from an actuation of contact 20 after the condensers have been charged and selected, produces the discharge of small condenser 17 through the primary winding of 18 and the ionization of tube 19 then produces the start of the light flash.

The values of the condensers 3 to 6 are chosen such that their selective connection to the discharge lead, independent from one another, enables multiple circular permutations. As an example, condenser 3 may be of 600 microfarads; when charged under 500 volts, it will deliver to the flash an energy equal to 75 Joules; condenser 4 may be of 1200 microfarads and delivers to the flash an energy equal to 150 Joules under the same 500 volts; condenser 5 may be of 2400 microfarads, supplying an energy to the flash equal to 300 Joules under 500 volts; and condenser 6 may be 4800 microfarads, supplying 800 Joules to the flash under 500 volts. The overall available energy, consequently, is 1,125 Joules, and the selection provides fifteen adjustments of the value of energy in the flash from 75 Joules, and by progressively adding 75 Joules up to 1,125 Joules—with condenser 3 alone, 75 Joules; with condenser 4 alone, 150; with both condensers 3 and 4, 225; condenser 5 alone, 300; condensers 3 and 5, 375 Joules; and so on.

The values of the resistances 8 to 11 are so chosen that the time constant of the charge is equal in all condenser branches, 3–8, 4–9, 5–10, 6–11. The proper value of the time constant is made according to the intended use of the device.

For selecting one of the condensers so that its stored energy is delivered to the flash, the slider of its associated potentiometer is brought to the point of connection between said condenser and said potentiometer. For selecting a condenser so that its energy is not used in the flash, the slider is brought to the dead terminal. In FIG. 1, condensers 4, 5 and 6 are selected to enter into the operation of the flash and the condenser 3 is selected not to enter in such operation.

Thereafter, the actuation is as follows: the operator actuates inverter contact 37 for charging the condensers; if he had not made his selection or wants to modify it, it may be made without drawback after the charge of the condensers. The operator is thereafter free to press the push-button actuating contact 20 for producing the flash. When he wants not to produce the flash but to reset the device, he puts the inverter 37 back in the condition shown and all condensers are discharged through their series resistors, to the ground lead 15.

When the operator actuates contact 20, the condensers 4, 5 and 6 (in the example shown in FIG. 1) are totally discharged but their re-charging immediately begins. Condenser 3 contributes to the re-charging but the circulation current passes through 8 and thereafter through 9, 10, 11 in parallel. When the operator then actuates the slider of 8 towards its connection to the condenser 3, the resistors 9, 10 and 11 are first short-circuited then, the variation of position of the slider reduces the value of 8 so that finally all four condensers are in parallel connection. Due to the logarithmic character of the potentiometer, during the approach of the slider of resistor 8 to the condenser connection terminal and during the time interval the voltages across all condensers tend to adjust one another up to a same value, these condensers are then connected by a rapidly decreasing resistance up to zero. The circulating current, always limited by the resistance of 8, as weak as it may be, takes the values suitable for ensuring at the end of the course of the slider of 8, the balance of the voltages and consequently the contact to condenser 3 will close without any spark. Conversely, after the slider is positioned on its dead terminal, the cut-off from the discharge circuit is effected when the whole resistor is inserted into the circuit and consequently with only a small circulating current.

With a view to reducing the cost of the resistance arrangement, one may substitute for the logarithmic resistances, sets of serially connected linear resistances. For instance, in FIG. 2, resistance pairs 28–58, 29–59, 30–60 and 31–61 are substituted for resistors 8 to 11. The resistance values of the parts 28 to 31 are higher than the resistance values of the parts 58 to 61. It may be said that this is a logarithmic quantification and of course, such quantification to discrete values may be provided with more than two parts. Multiple position switches, for instance three position switches in the example shown for resistors comprising two parts, have their terminals connected to the ends of the resistor parts. The blades of said switches, 33 to 36, are connected to the discharge lead 14. The operation is otherwise the same as that explained for the arrangement of FIG. 1.

Figure 2:
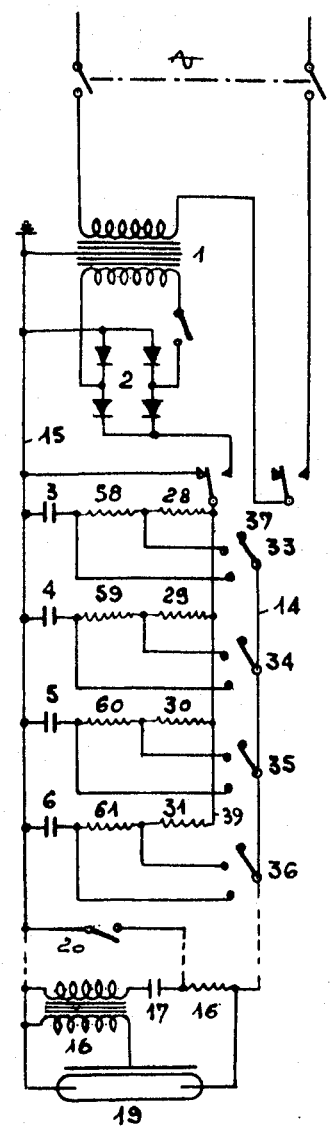
FIG. 2 shows an alternative embodiment using tapped resistors.
Figure 3:
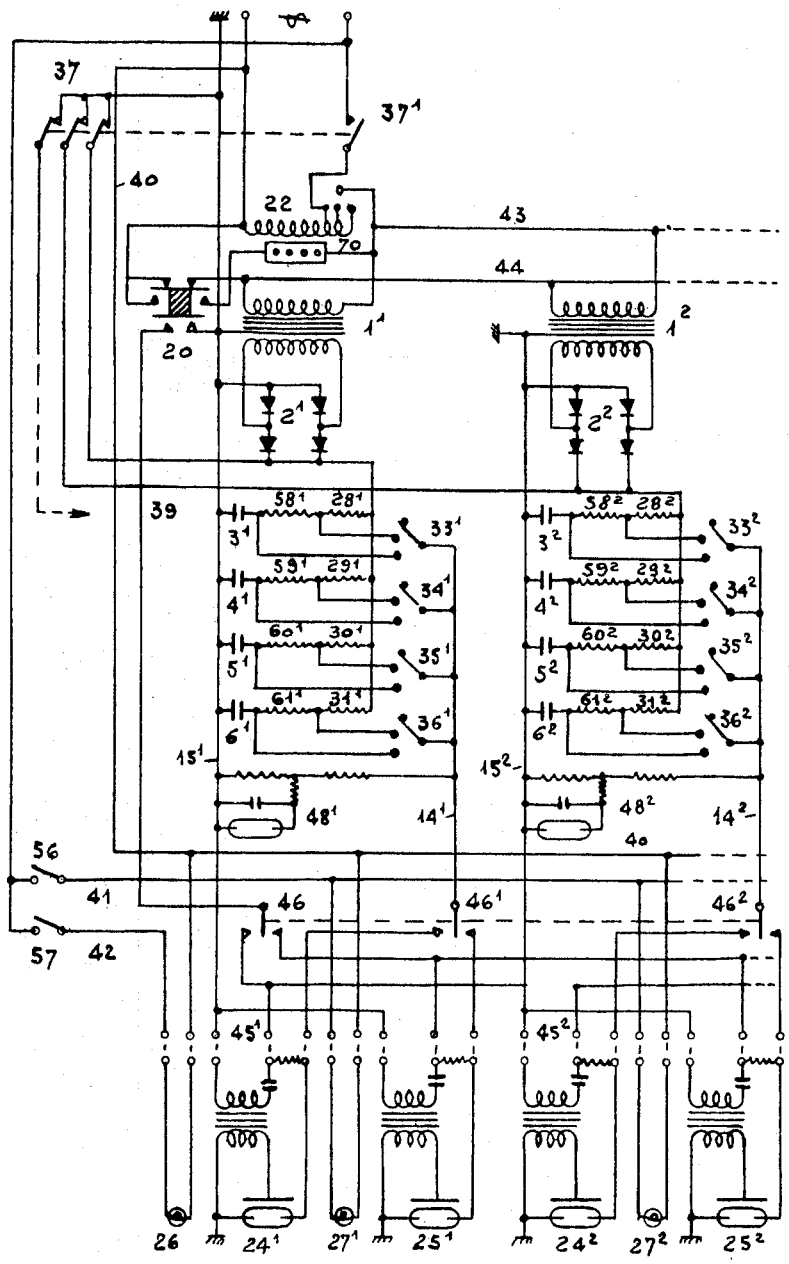
FIG. 3 shows a further embodiment capable of supplying multiple light flashes for instance for photo-engraving purposes.

FIG. 3 shows an example of a complex control equipment for controlling a plurality of flash tubes, which embodies several devices such as, for instance, the one of FIG. 2. Further, certain additional features are shown in said equipment. Of course, the equipment of FIG. 3 might as well use the device of FIG. 1. In FIG. 3, two devices are shown, the numerical references being the same but with an upper index, 1 for one device, 2 for the other one. In each device, a visual indicator, 48, for indicating or displaying the condition of the charge of the condensers is provided. This display indicator comprises a relaxation circuit with a neon tube connected across the high voltage and ground leads. When the operator has actuated at least one of the switches for selecting a condenser, or several of them, the display indicates when the selected condensers are completely charged or are charging—in the first case, the neon is steadily illuminated, in the second case, it scintillates. Further, such displays indicate that all the flash tubes have been actuated for a flash because, when several flashes are simultaneously initiated, it would otherwise be impossible to check that all the flashes have been duly obtained. After a flash control, whenever one of the neon tubes remains illuminated, the corresponding condenser group has not discharged indicating that the flash electronic discharge tube is defective and must be replaced.

The supply of the transformers $1^1$, $1^2$ . . . of the control devices (the complete equipment may comprise any required number of such devices) is made from leads 43–44 by means of an auto-transformer 22 which is connected to the A.C. supply through an on-off switch 37¹. Said switch is coupled with as many switches 37 as the devices in the equipment. With such an arrangement, when the supply is cut off at 37¹, ground is applied by all the switches 37 to the condensers of their corresponding devices through the series resistors associated with said condensers. The discharge of the condensers is thus made automatic when the A.C. supply is cut off.

There is a first group of flash tubes shown at 24¹, 24² . . . and a second group of flash tubes shown at 25¹, 25² . . . . With respect to the control voltage generating arrangements, these tubes are grouped by pairs, the arrangement with the suffixes 1 for its components may control the discharge of either 24¹ or 25¹ according to whether a change-over switch 46¹ is brought on its left-hand or its right-hand contact (on the drawing); the arrangement with the suffix 2 attached to the numbers of its components may similarly control either tube 24² or tube 25² according to the condition of switch 46²; and so forth. The inverter switches 46 are shown as being mechanically coupled together with a further inverter switch 46 to the impulse control contact 20. The inverter switch 46 thus enables at a single actuation the reversal of all the discharge control in parallel connection. Of course, contacts 46¹, 46² . . . may be omitted but they are shown as they may, when required, be mechanically made distinct for a special selection purpose by the operator. Connections 45¹, 45² . . . ground the impulse circuits of the flash tubes. When the operator, once the adjustments are made, presses the contact 20, the flashes occur and, simultaneously, contact 20 cuts the A.C. supplies of the transformers 1¹, 1² . . . by opening the lead 44. Such an arrangement of the contact 20 avoids the establishment of arcing from the rectifier supplies. A similar arrangement for the impulse control contact 20 may also be used in the devices as shown in FIGS. 1 and 2. Each actuation of 20 may further actuate a counter of the number of flashes shown at 70.

The tubes 24 of the first group may be optically grouped for lighting a surface according to a predetermined light distribution; on the other hand, the tubes 25 may be left separate in view of their special distribution with respect to a surface to be lit by the operator himself. Of course the uses of such groups of flash tubes are distinct. For enabling the operator to prepare the work with one group while using the other one, an inspection lamp 26 is associated with the first group of flash tubes, and each tube 25 is provided with an individual inspection lamp 27. By actuating the switches 56 and 57, the operator may branch an inspection lamp or several of them if desired. The switch 57 closes the lead 42 of the lamp 26, the switch 56 closes the lead 41 to the lamps 27. When tubes 24 are separate, each one may be associated with a separate inspection lamp. Such tubes 24 may be divided in sub-groups; in such a case, an inspection lamp is associated with each sub-group. Generally speaking as well for lighting surfaces as for other uses, such as optical signalling, the flash tubes may be associated, separately or in groups, with optical systems capable of generating the required light distribution for the intended purposes.

What is claimed is:
1. A flash light generator device comprising in combination:
   a plurality of circuits each including a series connection of at least one condenser and resistor, said circuits being connected in parallel with each other;
   a source of direct current;
   a charging circuit for simultaneously charging said condensers through said resistors from said source;
   at least one electronic flash discharge tube having main and starting electrodes;
   means separate from said charging circuit for connecting said main electrodes in parallel with preselected ones of said condensers only;
   and means connected to said starting electrode for delivering a pulse of energy thereto enabling discharge of preselected ones of said condensers through said tube to produce a light flash.
2. A device as defined in claim 1 in which each said resistor is a potentiometer having its slider connected to one of said main electrodes.
3. A device as defined in claim 1 in which each resistor includes a tap and wherein a multi-pole switch is provided with the movable arm connected to one of said main electrodes and the poles connected to said resistor, said tap and said condenser.
4. A device as defined by claim 2 wherein each said potentiometer has an electrically logarithmic taper between its end remote from its associated condenser and said condenser.
5. A device as defined by claim 1 in which the time constants of each of said series circuits are equal to each other.
6. A device as defined by claim 1 including means for discharging said condensers to ground.
7. A device as defined by claim 1 including a plurality of flash tubes and means for selectively energizing said tubes from said circuits.
8. A device as defined by claim 7 and including an inspection lamp associated with each said flash tube.

References Cited by the Examiner
UNITED STATES PATENTS

| | | | |
|---|---|---|---|
| 2,342,257 | 2/1944 | Edgerton | 315—241 |
| 2,358,796 | 9/1944 | Edgerton | 315—241 |
| 2,393,316 | 1/1946 | Edgerton | 315—241 |

DAVID J. GALVIN, *Primary Examiner.*

C. R. CAMPBELL, *Assistant Examiner.*